Jan. 18, 1949.  A. G. HEWITT ET AL  2,459,235
FLAME SEALING APPARATUS

Filed April 5, 1946   3 Sheets-Sheet 1

INVENTORS
ALFRED G. HEWITT AND
SYLVESTER F. CLEMENT
BY
Wm. S. Pritchard
ATTORNEY.

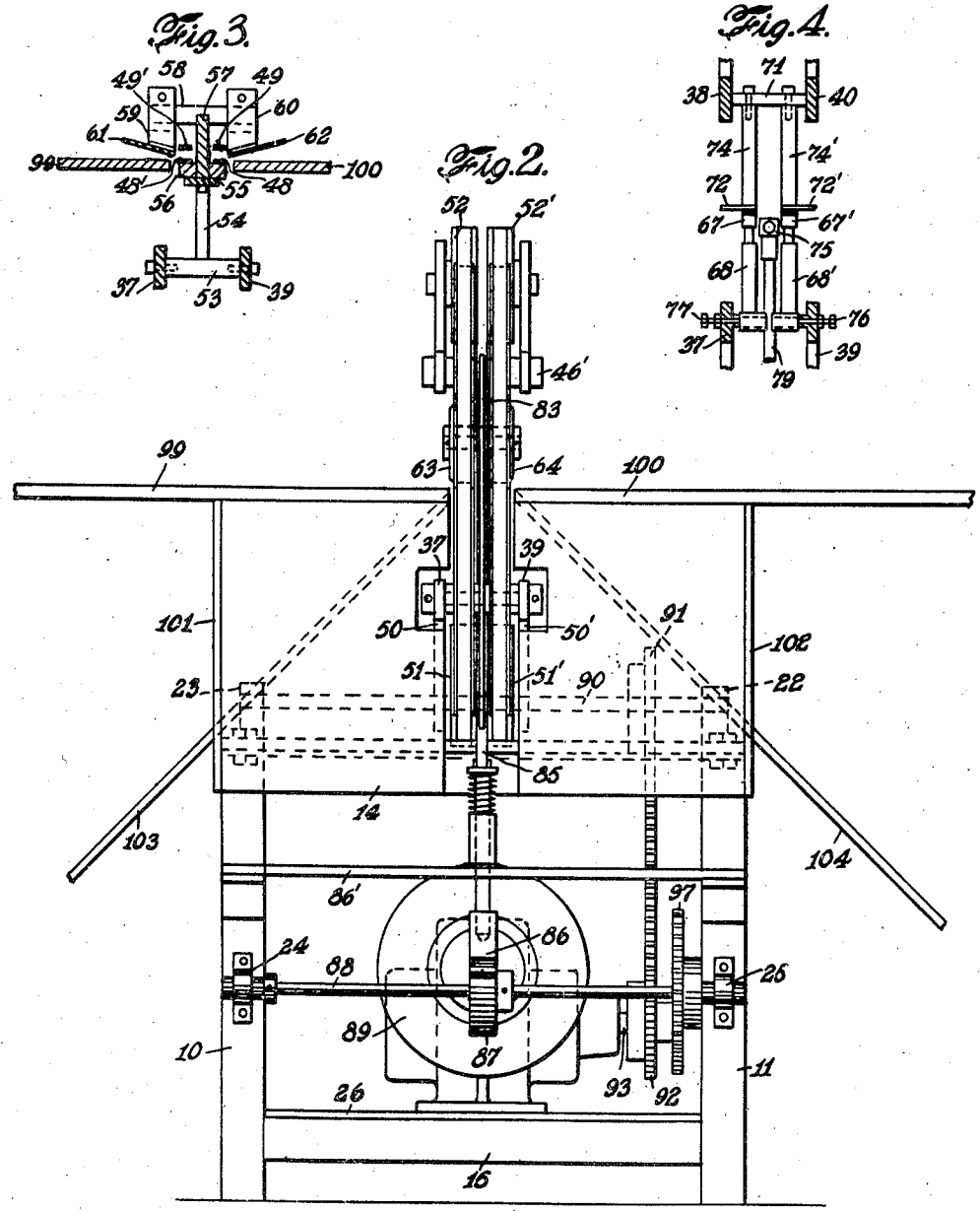

Jan. 18, 1949.  A. G. HEWITT ET AL  2,459,235
FLAME SEALING APPARATUS
Filed April 5, 1946  3 Sheets-Sheet 3
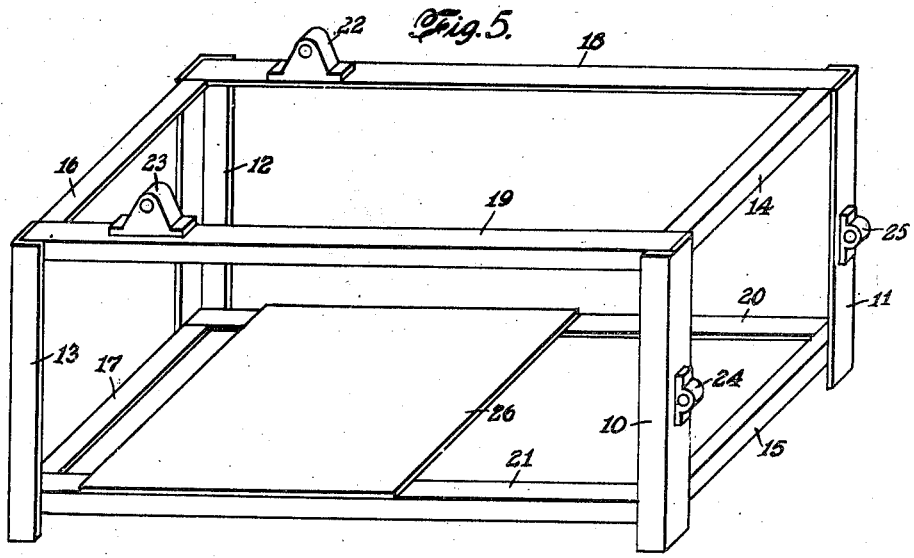
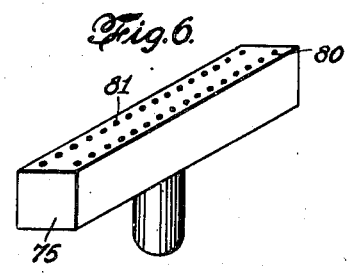
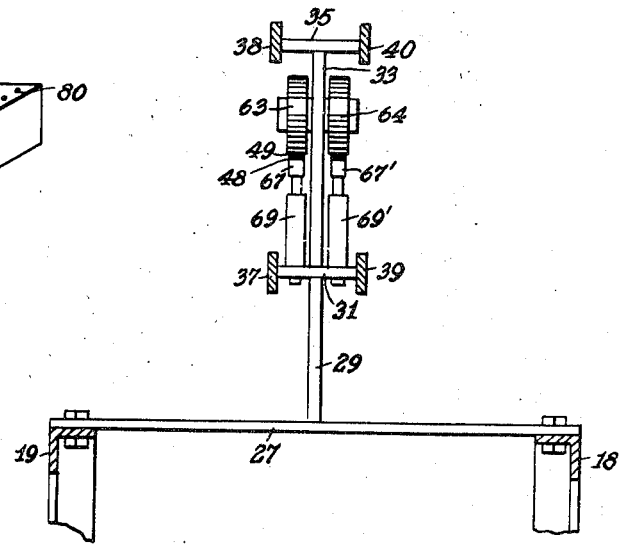
INVENTORS
ALFRED G. HEWITT AND
BY SYLVESTER F. CLEMENT
WM. S. Pritchard
ATTORNEY.

Patented Jan. 18, 1949

2,459,235

UNITED STATES PATENT OFFICE 2,459,235

FLAME SEALING APPARATUS

Alfred G. Hewitt, La Grange Park, and Sylvester F. Clement, Chicago, Ill., assignors to The Visking Corporation, Chicago, Ill., a corporation of Virginia Application April 5, 1946, Serial No. 659,970

9 Claims. (Cl. 154—42)

This invention relates to an apparatus for flame sealing sheets of thermoplastic material in order to secure the edge of one sheet or layer of thermoplastic material to the edge of another. It relates more particularly to bonding sheets or layers of thermoplastic material of the order of thickness of from 0.0002" to 0.03", although it is within the scope of this invention to bond thicker sheets of thermoplastic material.

This invention is particularly adapted to bond and close the ends of thermoplastic tubes to form gas, moisture and waterproof bags or containers in which various articles may be packaged. The apparatus has been found satisfactory to close the ends of seamless tubes made from polyethylene, although it may be used to bond various other thermoplastic materials such as, by way of example but not by way of limitation, polyisobutylene, rubber hydrochloride, ethyl cellulose, cellulose acetate and copolymers of vinyl chloride and vinyl acetate.

It is well known that when sheets of plastic material are submitted to an open flame in an oxidizing atmosphere, such as air, the plastic has a tendency to char, and, in many instances, to decompose. It has been found that by the use of the apparatus of this invention the end of a thin seamless tube of plastic material may be sealed without charring and without decomposition, leaving a gas, moisture and waterproof beaded seam that is even stronger than the material of which the bag itself is formed.

In general, the machine consists of two endless steel bands which travel in contact with the article to be acted on and carry it past the flame and out of the machine. The machine of this invention is illustrated as a double machine having means for feeding thermoplastic tubes and the like from either side. In the description, only one side will be described, since the other side is exactly alike, except that enough description will be given as is necessary to make clear how the parts are related to each other.

Referring to the drawings:

Figure 2 is an end view of the machine taken from the right of Figure 1, and shows clearly the feeding table and guard heretofore referred to;

Figure 3 is a partial section taken through the line 3—3 of Figure 1, and looking in the direction of the arrows;

Figure 4 is a partial section taken through the line 4—4 of Figure 1, and looking in the direction of the arrows;

Figure 5 is a perspective view of the main frame of the machine;

Figure 6 is a perspective view of the gas burner of the machine;

Figure 7 is a partial section taken through the line 7—7 of Figure 1, and looking in the direction of the arrows.

Figures 1, 8:
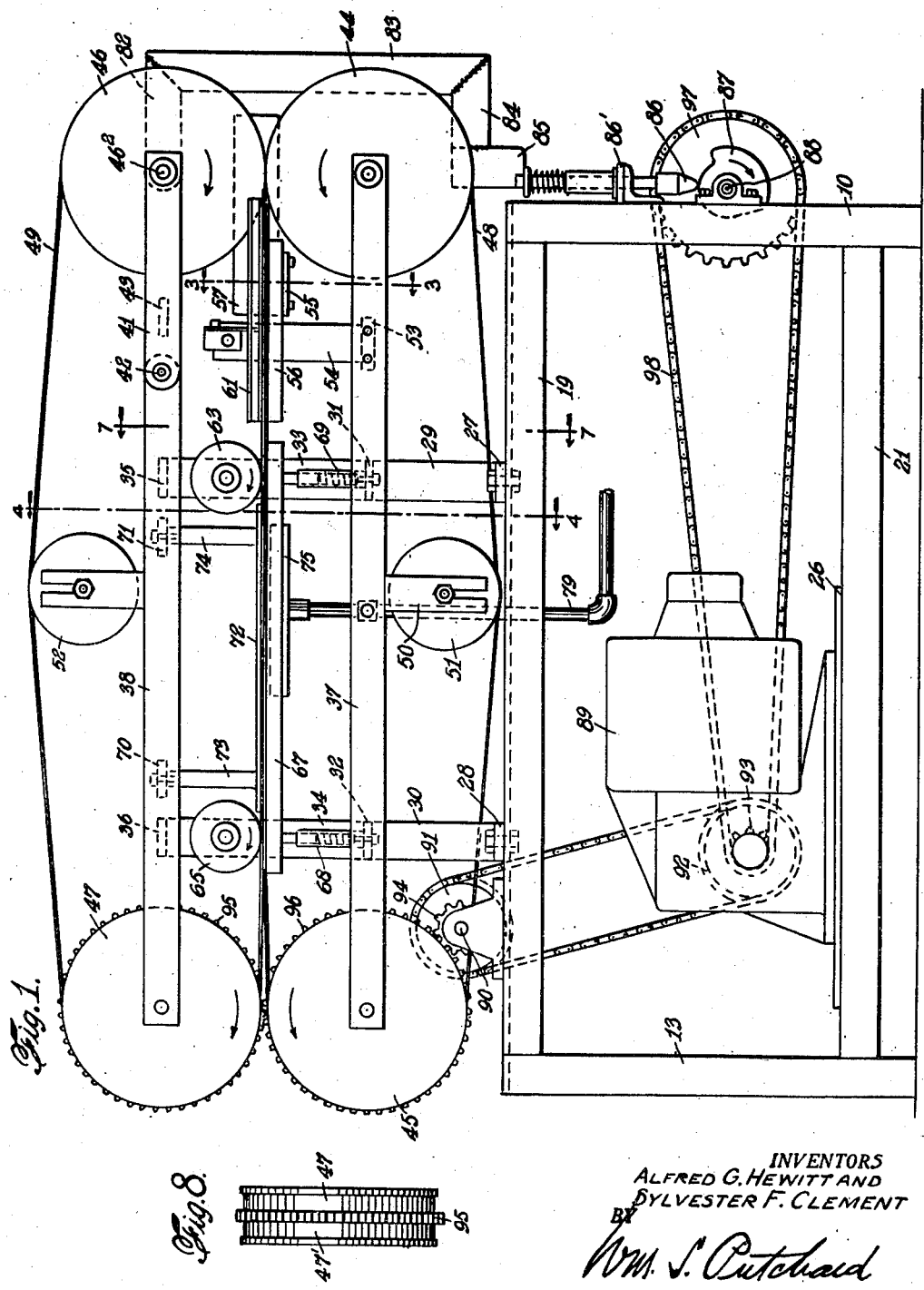
Figure 1 is a side elevation of one side of the machine with the feeding table and guard removed.
Figure 8 is an end view of the wheels supporting the endless belts showing the gear driving the same.

Referring to Figure 5, the frame consists of uprights 10, 11, 12 and 13. These uprights are connected with cross-pieces 14, 15, 16 and 17, and with horizontal members 18, 19, 20 and 21. This frame may be welded together or cast in sections at one's option. Mounted on the horizontal members 18 and 19 are pillow blocks 22 and 23. Mounted on the uprights 10 and 11 are pillow blocks 24 and 25 respectively. These pillow blocks form bearings for shafts which will hereinafter be described. Mounted on the horizontal pieces 20 and 21 is a shelf-like structure 26 which forms a support for the motor and reduction gear mechanism, which will hereafter be described. Mounted on the horizontal pieces 18 and 19 are cross-pieces 27 (see Figure 7) and 28 (see Figure 1). Mounted on the cross-pieces 27 and 28 are upright members 29 and 30 (see Figures 1 and 7). Cross-members 31 and 32 are secured to the top of the uprights 29 and 30 respectively. Secured to the cross-members 31 and 32 respectively are upright members 33 and 34. The upright members 29, 33, 30 and 34, with the cross-members 31 and 32, form supporting means for various parts of the machine.

On the top of the uprights 33 and 34 are cross-pieces 35 and 36 respectively. Bar-like members 37, 38, 39 and 40 (see Figures 1 and 7) are supported by the cross-members 31, 32 and 35, 36 respectively. The cross-members are welded to the bars. The bars 38 and 40 have their ends pivoted on a common pivot 42. The end pieces of the bars 38 and 40 are secured together by a cross-piece 43. The purpose of the pivot and cross-piece will hereafter be described.

Mounted on each end of the longitudinal members 37, 39, 38 and 40 are grooved wheels 44, 45, 46 and 47. The grooved wheels 44 and 45 form a support for an endless metal belt 48 while the grooved wheels 46 and 47 form a support for endless metal belt 49. The endless belts 48 and 49 are about .018 of an inch thick and ⅝ of an inch wide, and may be made of spring steel. Similar belts are mounted on companion wheels 44', 45', 46', and 47'.

Mounted on the longitudinal member 37 is bracket member 50, one end of which is split. There is a corresponding bracket on the longitudinal member 39, similar to 50, but not shown. These brackets form a support for an idler pulley 51, which bears against the belt 48 to keep it taut while the roller mounted on the corresponding longitudinal member 39 performs the same function for the opposite belt. A similar construction mounted on the top of the longitudinal member 38 supports a roller 52, the corresponding roller not being shown, which bears on the corresponding steel band which forms the other part of the double machine. The longitudinal members 37 and 39 are connected together by cross-piece 53. Mounted on this cross-piece is an upright member 54 (Figures 1 and 3). To the upper part of the upright member 54 are secured two plates 55 and 56, and to the plate 56 is secured an upright member 57 which carries a cross-member 58 with two depending members 59 and 60 (Figure 3), each one carrying a guide plate 61, 62 (see Figures 1 and 3). The member 56, together with the guide plates 61, 62, form means for positioning the articles to be sealed so that the proper amount of the ends thereof are exposed to the flame. The amount of material exposed to the flame is from 1/16 to 3/16 of an inch, depending upon the thickness of the material to be sealed.

Mounted on the upright member 33 are two wheels 63 and 64. Mounted on the upright member 34 are two wheels 65 and 66, 66 being beyond 65 and not shown. The two wheels 63 and 65 are adapted to press against the belts 48 and 49 to hold them together. This is accomplished by a flat bar 67 which is supported on spring-pressed plungers 68 and 69. These plungers are supported on the cross-members 31 and 32 respectively. The other side of the machine has a corresponding set of wheels, and a corresponding pressure plate, and spring-pressed plungers.

Mounted on the longitudinal members 38 and 40 are cross-bars 70 and 71. A plate 72 is downwardly supported from the cross bars by means of members 73 and 74. The plate 72 forms an abutment for the spring-pressed bar 67 and tends to hold the belts 49, 48 pressed close against the article to be acted on as it passes through the machine. The other side of the machine is equipped with a corresponding plate and supports which tend to hold the other two bands on the opposite side of the machine in close relationship to the article being operated on on the opposite side of the machine.

A burner 75 (see Figures 1, 4 and 6) is adjustably mounted between the longitudinal members 37 and 39 and is held in proper relationship with the moving bands by the adjustment screws 76 and 77 (see Figure 4). The burner is connected to a source of gas and air by means of a pipe 78. It will be noted that the burner 75 has two rows of openings 80 and 81, each row serving one side of the machine.

The ends of the bars 38 and 40, which have been described as being pivoted at 42 and joined by the crosspiece 43, are connected with the pivot 46² on which the end wheels 46 and the corresponding one on the other side (not shown) are mounted. A horizontal arm 82 is also pivoted at 46². An upright member 83, a horizontal member 84, and an upright member 85 form a U-shape continuation with 82. To the member 85 is secured a spring-pressed cam follower 86, guided in a bar 86', supported on brackets, which is adapted to act on the cam 87. This cam 87 is supported by a shaft 88 mounted in the pillow blocks 24 and 25. The rotation of the cam tends to lift the articulated ends of the bars 38 and 40, with accompanying guide wheels for the steel bands, periodically to enable the attendant to feed the edge of the object to be acted on, such as an edge of a tubular plastic tube, past the guide member 61, between the steel bands 48, 49, and against the abutment 57. Further rotation of the cam permits the wheels at the ends of the bars 38 and 40 to fall, thereby bringing the belts 48 and 49 in close contact with the article to be operated on.

Mounted on the shelf 26 is a combined motor reduction gear unit 89 of well-known construction. Mounted on the pillow blocks 22 and 23 is a shaft 90, to which is secured a sprocket 91, which is driven by a chain from a sprocket 92 on shaft 93 of the reduction unit. Mounted on the shaft 90 is a toothed gear 94. The grooved wheel 47, with its companion wheel 47' (Figure 8) from the other side of the machine, are secured to a gear 95. Likewise, the grooved wheel 45, with its companion wheel from the other side of the machine, are joined together by a toothed gear 96. The gears 95 and 96 are adapted to mesh with each other, and the gear 94 is likewise adapted to mesh with the gear 96. Thus, the rotation of the shaft 90 by means of the motor drives the combined pulley units 45 and 47 in synchronism so that the belts 48 and 49 travel at the same speed. The shaft 88 carries a sprocket 97 which is driven by a chain 98 from the motor unit 89.

Each side of the double machine has a feeding table 99, 100. The feeding tables are supported by the uprights 101 and 102 respectively. Beyond the feeding tables are inclined shields or guards 103 and 104. These shields tend to support the end of the tube grasped by the moving bands and offer less friction than if they were horizontal. Furthermore, they tend to prevent the unsealed ends of the tubes, and also the operators, from coming in contact with the moving parts of the machine.

One operation of the machine will now be described in the process of sealing tubes to make bags or pouches therefrom.

The burner is lit, the power turned on the machine, and the operator sitting at the feeding table 99 inserts one end of a tube from a supply of open-ended tubes on the table beneath the guide plate 61 and up against the gauge 57 so as to expose the exact amount of material to be sealed by the flame. This operation is done while the cam 87, with its accompanying U-shaped members 82, 83 and 84, raises the wheel 46, with its accompanying steel band 49, out of contact with the band 48, as is shown in Figure 3. As the cam travels on its journey, it lowers the member 46, with its accompanying band 49, into intimate contact with the material and holds it firmly between the two belts 48 and 49. The movement of these belts, because the two pulleys 45 and 47 are being driven by the power unit, causes the tube to travel through the machine and brings the exposed end of the tube into contact with the flame coming out of the openings 80 of the burner 75. The spring-pressed plate 67, together with the stationary plate 72 and the two rollers 63 and 65, hold the steel belts closely together against the work, leaving only from 1/16 to 3/16 of an inch of the end of the tube exposed to the action of the flame. The end of the tube being enclosed between the two metal belts 48 and 49 only permits the exposed edge to come in contact with the flame, thereby quickly sealing the same without any decomposition of the plastic material. The belts also being of metal and traveling through the air from the ejection end of the machine on their return to the feed end tend to dissipate any heat which they may have collected while the sealing operation was performed. It is obvious that with each rotation of the cam 87, the pulley 46, with its accompanying belt 49, is raised, permitting another tube to be inserted against the gauge and travel through the machine. The operator at the feeding table 100 performs a similar operation on the other side of the machine on each raising of the corresponding metal belt. The machine forms a uniform beaded seal on the end of the tube which has been passed through the flame, leaving a strong bag or pouch in which any article may be packaged.

Since it is obvious that many changes and modifications can be made in the above-described details without departing from the nature and spirit of the invention, it is to be understood that the invention is not to be limited thereto except as set forth in the appended claims.

We claim:

1. An apparatus for flame sealing thin-walled thermoplastic tubing which comprises a pair of driven belts located one above the other and adapted to contact with each other, cam actuated means to separate said belts periodically at the feed end of the machine to permit insertion of the tubing to be sealed between said belts, means to position said tubing between said belts whereby only a small portion of the end of the tubing is exposed beyond the edges of the belts, and a burner providing an open flame in the path of travel of the exposed end of said tubing whereby said end is sealed as it is conveyed through said flame by said belts.

2. An apparatus for flame sealing thin-walled thermoplastic tubing which comprises a pair of driven belts located one above the other and adapted to contact with each other, cam actuated means to separate said belts periodically at the feed end of the machine to permit insertion of the tubing to be sealed between said belts, means to position said tubing between said belts whereby only a small portion of the end of the tubing is exposed beyond the edges of the belts, a burner providing an open flame in the path of travel of the exposed end of said tubing whereby said end is sealed as it is conveyed through said flame by said belts, and means to hold said belts in close engagement with said tubing as it passes through the zone of action of said flame.

3. An apparatus for flame sealing thin-walled thermoplastic tubing which comprises a pair of driven belts located one above the other and adapted to contact with each other, means to raise the upper belt at the feed end of the machine at predetermined intervals to permit insertion of the tubing to be sealed between said belts, means to lower said upper raised belt into position whereby said tubing is gripped between said belts, and a burner providing an open flame in the path of travel of the end of said tubing whereby said end is sealed as it is conveyed through said flame by said belts.

4. An apparatus for flame sealing thin-walled thermoplastic tubing which comprises a pair of driven belts located one above the other and adapted to contact with each other, means to raise the upper belt at the feed end of the machine at predetermined intervals to permit insertion of the tubing to be sealed between said belts, means to lower said upper raised belt into position whereby said tubing is gripped between said belts, a burner providing an open flame in the path of travel of the end of said tubing whereby said end is sealed as it is conveyed through said flame by said belts, and means to hold said belts in close engagement with said tubing as it passes through the zone of action of said flame.

5. An apparatus for flame sealing thin-walled thermoplastic tubing which comprises a pair of driven belts located one above the other and adapted to contact with each other, means to raise the upper belt at the feed end of the machine at predetermined intervals to permit insertion of the tubing to be sealed between said belts, means to lower said upper raised belt into position whereby said tubing is gripped between said belts, means to position said tubing between said belts whereby only a small portion of the end of the tubing is exposed beyond the edges of the belts, and a burner providing an open flame in the path of travel of the exposed end of said tubing whereby said end is sealed as it is conveyed through said flame by said belts.

6. An apparatus for flame sealing thin-walled thermoplastic tubing which comprises a pair of driven belts located one above the other and adapted to contact with each other, means to raise the upper belt at the feed end of the machine at predetermined intervals to permit insertion of the tubing to be sealed between said belts, means to lower said upper raised belt into position whereby said tubing is gripped between said belts, means to position said tubing between said belts whereby only a small portion of the end of the tubing is exposed beyond the edges of the belts, a burner providing an open flame in the path of travel of the exposed end of said tubing whereby said end is sealed as it is conveyed through said flame by said belts, and means to hold said belts in close engagement with said tubing as it passes through the zone of action of said flame.

7. An apparatus for flame sealing thin-walled thermoplastic tubing which comprises a pair of driven endless belts located one above the other with the lower flight of the top belt contacting the upper flight of the lower belt, means to alternately raise and lower the upper belt at the feed end of the machine at predetermined intervals to permit insertion and gripping of the tubing to be sealed by said belts, means to position said tubing between said belts whereby only a small portion of the end of the tubing is exposed beyond the edges of the belts, and a burner providing an open flame in the path of travel of the exposed end of said tubing whereby said end is sealed as it is conveyed through said flame by said belts.

8. An apparatus for flame sealing thin-walled thermoplastic tubing which comprises a pair of driven endless belts located one above the other with the lower flight of the top belt contacting the upper flight of the lower belt, means to alternately raise and lower the upper belt at the feed end of the machine at predetermined intervals to permit insertion and gripping of the tubing to be sealed by said belts, means to position said tubing between said belts whereby only a small portion of the end of the tubing is exposed beyond the edges of the belts, a burner providing an open flame in the path of travel of the exposed end of said tubing whereby said end is sealed as it is conveyed through said flame by said belts, and means to hold said belts in close engagement with said tubing as it passes through the zone of action of said flame.

9. An apparatus for flame sealing thin-walled thermoplastic tubing which comprises a pair of driven endless belts located one above the other with the lower flight of the top belt contacting the upper flight of the lower belt, means to alternately raise and lower the upper belt at the feed end of the machine at predetermined intervals to permit insertion and gripping of the tubing to be sealed by said belts, means to position said tubing between said belts whereby only a small portion of the end of the tubing is exposed beyond the edges of the belts, a burner providing an open flame in the path of travel of the exposed end of said tubing whereby said end is sealed as it is conveyed through said flame by said belts, and means to hold said belts in close engagement with said tubing as it passes through the zone of action of said flame, said belts separating at the discharge end to release the sealed tubing and discharge it from the apparatus.

ALFRED G. HEWITT.
SYLVESTER F. CLEMENT.

REFERENCES CITED

The following references are of record in the file of this patent:

UNITED STATES PATENTS

| Number | Name | Date |
|---|---|---|
| 1,361,970 | Dickey | Dec. 14, 1920 |
| 2,075,735 | Loomis | Mar. 30, 1937 |
| 2,224,017 | Gurwick | Dec. 3, 1940 |
| 2,379,361 | Bombard | June 26, 1945 |
| 2,380,914 | Billeb | Aug. 7, 1945 |